United States Patent [19]

Ruigrok et al.

[11] Patent Number: 4,907,115
[45] Date of Patent: Mar. 6, 1990

[54] SUPER CONDUCTING THIN-FILM MAGNETIC HEAD INCLUDING A MAGNETORESISTIVE ELEMENT

[75] Inventors: Jacobus J. M. Ruigrok; Victor Zieren, both of Eindhoven, Netherlands

[73] Assignee: U.S. Philips Corp., New York, N.Y.

[21] Appl. No.: 218,009

[22] Filed: Jul. 12, 1988

[30] Foreign Application Priority Data

Jul. 15, 1987 [NL] Netherlands ............... 8701663

[51] Int. Cl.[4] .................................................. G11B 5/30
[52] U.S. Cl. ................................... 360/113; 360/126; 505/872
[58] Field of Search ............... 360/113, 126; 505/872, 505/845, 846

[56] References Cited

U.S. PATENT DOCUMENTS 4,679,107  7/1987  Imakoshi ..................... 360/113

FOREIGN PATENT DOCUMENTS 0021392  7/1981  European Pat. Off. .
0063397  10/1982  European Pat. Off. .
0122660  10/1984  European Pat. Off. .
1522971  10/1969  Fed. Rep. of Germany .
56-145514  11/1981  Japan .
56-156914  12/1981  Japan .
60-154315  8/1985  Japan .
2146481  4/1985  United Kingdom .

Primary Examiner—A. J. Heinz
Attorney, Agent, or Firm—William L. Botjer

[57] ABSTRACT

Thin-film magnetic head including a magnetoresistive element (1) and a face (9) for magnetically coupling the element with a magnetic recording medium. A magnetic yoke constituted by three layers (3, 5, 7) of a magnetically permeable material has a gap (13) which is bridged by the magnetoresistive element. A layer (15) of a superconducting material for improving the efficiency of the magnetic head is provided between the layers (3) and (5) and the element (1) on the one hand and the layer (7) on the other hand. For protection from external disturbing magnetic fields and reduction of stray flux a layer (43A, 43B, respectively) of a superconducting material is provided on the layers (3) and (5) and under the layer (7).

4 Claims, 1 Drawing Sheet

SUPER CONDUCTING THIN-FILM MAGNETIC HEAD INCLUDING A MAGNETORESISTIVE ELEMENT

BACKGROUND OF THE INVENTION

The invention relates to a thin-film magnetic head including a magnetoresistive element and a face for magnetically coupling the magnetoresistive element with a magnetic recording medium. A first layer and a coplanar second layer both consist of a magnetically permeable material, a gap bridged by the magnetoresistive element being present between the layers. The first layer has an end remote from the magnetoresistive element and adjoining the face. A third layer of a magnetically permeable material located on a side of the magnetoresistive element remote from the first and second layers extends from the face and is magnetically connected to the second layer.

A magnetic head of this type is illustrated in U.S. Pat. No. 4,489,357, herein incorporated by reference, which is particularly, but not exclusively intended for detecting magnetic fields of magnetic recording media such as magnetic tape or discs.

Magnetic heads of the type described above have an elongated resistive element. The magnetoresistive element may be magnetically biased, whilst for linearizing the reproducing characteristic of the magnetoresistive element it is necessary to apply a static magnetic field in order to displace the working point to a linear region of the resistance-magnetic field curve.

A magnetically biased magnetoresistive element is described, for example in European Patent Application 0,063,397, to which U.S. application No. 314,149 corresponds herein incorporated by reference. The magnetoresistive element may alternatively be a current-biased resistive element in which one or more oblique strips conducting in an electrically satisfactory manner are provided on one of the surfaces of the magnetoresistive element at an angle of approximately 45° to the longitudinal axis of the element. The conducting strips function as equipotential strips in order that the direction of the current in the element, which is perpendicular to the equipotential strips, also extends at an angle of approximately 45° to the easy axis of magnetization so that the transducing characteristic is linearized. A current-biased magnetoresistive element is described, for example in U.S. Pat. No. 4,425,593, herein incorporated by reference.

The known thin-film magnetic head has the drawback that during operation a relatively large amount of magnetic flux is lost between the flux-conducting layers of a magnetically permeable material located on the recording medium side of the magnetoresistive element, which loss results in a low efficiency of the known magnetic head.

SUMMARY OF THE INVENTION

A layer of a superconducting material is provided between the magnetoresistive element and the third layer of a magnetically permeable material. A superconducting material is herein understood to mean a material which is in a superconducting state and which exhibits the full or substantially full Meissner effect. For practical reasons materials are preferred which have a relatively high critical temperature, for example above the temperature at which nitrogen liquefies at a normal pressure. Suitable materials are, for example superconducting ceramic materials formed from compounds of lanthanum, barium, copper and oxygen such as $La_{1-x}Ba_xCuO_4$, with x between 0.15 and 0.6; lanthanum, strontium, copper and oxygen such as $La_{2-x}Sr_xCuO_4$, with x between 0.15 and 0.2; yttrium, barium, copper and oxygen such as $YBa_2Cu_3O_{7-d}$, with d between 0.0 and 1.0 or $Y_{0.4}Ba_{0.6}Cu_{1.0}O_{3.0}$; or yttrium, barium, strontium, copper and oxygen such as $YBa_{2-x}Sr_xCu_3O_8$ in which a part of the elements may be partly substituted, for example oxygen by fluorine or strontium by calcium.

The Meissner effect prevents magnetic loss flux from occurring between the parts of the magnetically permeable layers (first, second layers and magnetoresistive element, and third layer, respectively) located on either side of the layer of a superconducting material. Consequently the magnetic flux density through the magnetoresistive element can be increased considerably. If the layer of a supeconducting material extends through a sufficiently large region, the magnetic potential losses occurring in the magnetic head can be reduced to potential losses which are dependent only on the magnetic resistance of the materials chosen for the first, second and third layers. All this results in an essentially higher efficiency.

The measure according to the invention provides the possibility of placing the magnetoresistive element at a relatively large distance from the face for magnetic coupling of the magnetoresistive element with a recording medium without detrimentally influencing the transducing function, as is the case with the known magnetic head. However, for this purpose it is necessary that the layer of a superconducting material extends as far as the said face for magnetic coupling. A magneto-resistive element placed at a larger distance with respect to the face gives the magnetic head the advantage of a longer lifetime. In fact, the recording medium moving along the magnetic head produces mechanical wear, reducing the distance between the face for magnetic coupling and the magnetoresistive element. At a given minimum distance the magnetic head is no longer usable. The lifetime of the magnetic head is therefore also determined by the magnitude of the original distance between the face for magnetic coupling and the magnetoresistive element.

In addition to the above-mentioned drawback of the known magnetic head it has also the drawback that distortion may readily be produced, especially in uses in which a relatively large wavelength range must be detected such as in audio uses. Due to the manner in which the magnetic flux is passed to the magnetoresistive element the known magnetic head is sensitive both to magnetic flux which is supplied between the said first layer and third layer of a magnetically permeable material and to magnetic flux which is directly radiated from the exterior. The latter magnetic flux is associated with signals having longer wavelengths, whereas the magnetic flux supplied between the layers is associated mainly with signals having short wavelengths. Since the lower frequencies are amplified with respect to the higher frequencies, notably when recording audio information on a recording medium by means of a conventional write head, the characteristic upon detection of such an audiorecording is detrimentally influenced as a result of the externally radiated magnetic flux.

An embodiment of the magnetic head according to the invention in which the magnetoresistive element is adequately protected from the unwanted radiation of the magnetic flux is characterized in that a further layer of a superconducting material is provided on a side of the first and second layers of a magnetically permeable material remote from the magnetoresistive element.

It is to be noted that DE-A 1,522,971 describes a method of increasing the dynamic range and improving the signal-to-noise ratio in electromagnetic tape recordings by means of a sound head having an oblique gap. To this end the sound head is locally provided with a diamagnetic material so as to intensify the magnetic field lines on the gap and to obviate a too large stray field on the gap. However, the inductive magnetic heads shown in the Figures of DE-A 1,522,971 and obtained in accordance with the method described have such a shape and composition that they inhibit stray flux only at those locations where the stray flux is already small and does not exert much influence on the sensitivity of the magnetic heads. Therefore, as far as the efficiency of the magnetic heads shown is concerned, it does not make much difference whether the diamagnetic material is provided or not. The gaps of the magnetic heads shown have lengths which are also defined by parts of the diamagnetic material provided and are constant over a small gap height. This means that the gap length will vary very rapidly during operation, which is due to wear of the tape contact faces of the magnetic heads and will thus result in a short life of the heads.

DETAILED DESCRIPTION OF THE PREFERRED EMBODIMENT

Figure 1:
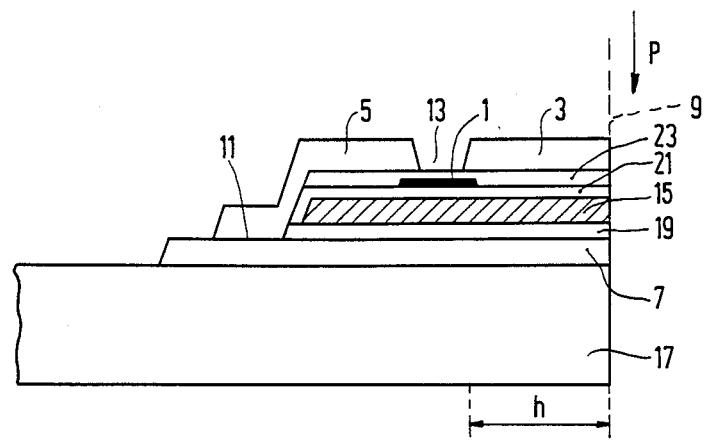
FIG. 1 is a diagrammatic cross-section of a first embodiment.

The thin-film magnetic head according to the invention shown in FIG. 1 is used for detecting magnetic fields from a magnetic recording medium which can be moved along the magnetic head in the direction of the arrow P. The magnetic fields are detected by measuring the resistance change of a magnetoresistive element 1 of the magnetic head. To this end the magnetic head comprises flux conductors in the form of three layers of a magnetically permeable material such as an NiFe alloy (permalloy), an FeSiAl alloy (sendust) or amorphous alloys. Of the three layers a first layer 3 ensures the flux collection and a second layer 5 and a third layer 7 ensure the flux return. The spatially separated layers 3 and 7 together bound a face 9 for magnetic flux coupling of the magnetoresistive element 1 with the magnetic recording medium, while the layers 5 and 7 are magnetically connected together in a region 11. The layers 3 and 5 are also spatially separated and constitute a gap 13 which is bridged by the magnetoresistive element.

The magnetoresistive element 1 is provided with connection faces (not shown) for connecting the element to a measuring current source, and with strips (not shown) which conduct in an electrically satisfactory manner and which extend at an angle of between 30° and 60° to the longitudinal axis of the element. The conducting strips are used to give the current a given direction with respect to the longitudinal axis in order to bias the magnetoresistive element. Such a magnetoresistive element has been described extensively in U.S. Pat. No. 4,425,593.

A layer 15 of a superconducting material, for example one of the previously mentioned superconducting materials is provided between the magnetoresistive element 1 and the third layer 7. In this embodiment the layer 15 extends from the said face 9 to beyond the magnetoresistive element 1 so that a large distance h without any loss of efficiency is possible between the magnetoresistive element 1 and the face 9.

The embodiment shown in FIG. 1 can be manufactured by means of a thin-film technique and comprises a substrate 17 of, for example oxidized silicon on which the following layer structure is provided by means of suitable masks:

(1) the said third layer 7, for example consisting of sputtered $Ni_{80}Fe_{20}$ (if the substrate is made of a magnetically permeable material such as a Ni-Zn ferrite, the third layer 7 can be dispensed with because the substrate can then function as a third layer;

(2) a first insulation layer 19 of, for example sputtered quartz;

(3) the superconducting layer 15 consisting of, for example sputtered $YBa_2Cu_3O_{7-d}$;

(4) a second insulation layer 21 of, for example a photo-resist;

(5) a sputtered layer of a magnetoresistive material which has been given the desired shape by means of etching in order to make it function as a magnetoresistive element;

(6) a third insulation layer 23;

(7) the first layer 3 and second layer 5 which may be sputtered, vapour-deposited or electro-deposited.

Figure 2:
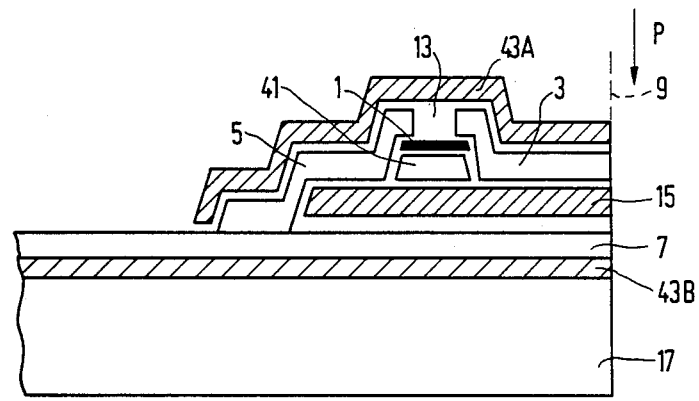
FIG. 2 is a diagrammatic cross-section of a second embodiment.

The embodiment shown in FIG. 2 bears a strong resemblance to the above-described thin-film magnetic head and will therefore be described concisely, using the same reference numerals for corresponding parts. A magnetoresistive element 1 is magnetically biased by an electrical current passed through an electric conductor 41. The magnetoresistive element bridges a gap 13 between a first layer 3 of a permeable material and a second layer 5 of a permeable material. Together with a third layer 7 of a permeable material, the two layers 3 and 5 constitute a magnetic yoke which constitutes a face 9 for flux coupling between the magnetoresistive element 1 and a magnetic recording medium to be moved along the magnetic head in the direction indicated by the arrow P. The space enclosed by the magnetic yoke accommodates a layer 15 of a superconducting material, which layer constitutes a magnetic barrier between the layers 3 and 5 and the magnetoresistive element 1 on the one hand and the layer 7 on the other hand. Such layers 43A and 43B are also provided on the layers 3 and 5 and on a substrate 17, respectively, for the purpose of shielding off disturbing magnetic fields and for a further reduction of the stray flux of the magnetic head.

The invention is of course not limited to the embodiments shown and described. Those skilled in the art will be able to conceive more modifications without passing beyond the scope of the invention. For example, it is possible to form the magnetic head according to the invention as a multitrack thin-film head for co-operation with multitrack magnetic recording media.

What is claimed is:

1. A thin-film magnetic head including a magnetoresistive element and a face for magnetically coupling the magnetoresistive element with a magnetic recording medium, comprising a first layer and an aligned second layer, both consisting of a magnetically permeable material, a gap provided which is bridged by the magnetoresistive element, being present between said layers, the first layer having an end remote from the magnetoresistive element and adjoining the said face, and a third layer of a magnetically permeable material located on a side of the magnetoresistive element remote from the first and second layers extending from the said face and being magnetically connected to the second layer of a magnetically permeable material, characterized in that a layer of a superconducting material is provided between the magnetoresistive element and the third layer of a magnetically permeable material.

2. A magnetic head as claimed in claim 1, characterized in that the layer of a superconducting material extends from the face for magnetically coupling the magnetoresistive element with a magnetic recording medium.

3. A magnetic head as claimed in claim 1, characterized in that a further layer of a superconducting material is provided on a side of the first and second layers of a magnetically permeable material remote from the magnetoresistive element.

4. A magnetic head as claimed in claim 1, characterized in that a layer of a superconducting material is provided on the side of the first, the second as well as the third layer of a magnetically permeable material remote from the magnetoresistive element.

* * * * *